US012295812B2

(12) United States Patent
McGlone

(10) Patent No.: US 12,295,812 B2

(45) Date of Patent: May 13, 2025

(54) MULTI-SENSORY ENRICHMENT WITH SELF-ADMINISTERING HEALTH PRODUCT DELIVERY SYSTEM

(71) Applicant: Texas Tech University System, Lubbock, TX (US)

(72) Inventor: John J. McGlone, Slaton, TX (US)

(73) Assignee: Texas Tech University System, Lubbock, TX (US)

( * ) Notice: Subject to any disclaimer, the term of this patent is extended or adjusted under 35 U.S.C. 154(b) by 0 days.

(21) Appl. No.: 18/798,616

(22) Filed: Aug. 8, 2024

(65) Prior Publication Data

US 2025/0041036 A1 Feb. 6, 2025

Related U.S. Application Data

(63) Continuation-in-part of application No. 17/937,930, filed on Oct. 4, 2022, now abandoned.

(60) Provisional application No. 63/347,331, filed on May 31, 2022, provisional application No. 63/252,009, filed on Oct. 4, 2021.

(51) Int. Cl.

*A61D 7/00* (2006.01)
*A61D 99/00* (2006.01)

(52) U.S. Cl.

CPC ............... *A61D 7/00* (2013.01); *A61D 99/00* (2013.01)

(58) Field of Classification Search

CPC ........... A01K 13/00; A61D 7/00; A61D 99/00
USPC ................................................. 119/651, 604
See application file for complete search history.

(56) References Cited

U.S. PATENT DOCUMENTS

| | | | |
|---|---|---|---|
| 1,075,855 | A | 10/1913 | Riley |
| 1,620,013 | A | 3/1927 | Eckerman |
| 2,316,932 | A | 4/1943 | Gordon |
| 4,126,104 | A | 11/1978 | Overby |
| 4,184,454 | A | 1/1980 | Nagao |
| 5,056,467 | A | 10/1991 | Schaefer |
| 5,785,004 | A | 7/1998 | Hobbs |
| 6,053,124 | A | 4/2000 | Kolbe |
| 6,615,769 | B2 | 9/2003 | Zioua |
| 6,966,276 | B2 | 11/2005 | Dollar |
| 2016/0081300 | A1 | 3/2016 | Harroff |
| 2019/0387708 | A1 | 12/2019 | Fussell, Jr. |

FOREIGN PATENT DOCUMENTS

GB 2313032 A * 11/1997 ........... A01K 1/0082

OTHER PUBLICATIONS

Animal Biotech Boar Better Pheromones (https://www.boar-better.com/benefits/) (Year: 2019).

* cited by examiner

*Primary Examiner* — Tye William Abell
*Assistant Examiner* — Maria E Graber
(74) *Attorney, Agent, or Firm* — POLSINELLI PC

(57) ABSTRACT

The present disclosure describes a self-sprayer device for self-administering an animal product to an animal and providing environmental enrichment to the animal.

18 Claims, 14 Drawing Sheets

MULTI-SENSORY ENRICHMENT WITH SELF-ADMINISTERING HEALTH PRODUCT DELIVERY SYSTEM

CROSS-REFERENCE TO RELATED APPLICATIONS

This application is a continuation-in-part of U.S. application Ser. No. 17/937,930, filed Oct. 4, 2022, which claims priority to U.S. Provisional Application No. 63/252,009, filed Oct. 4, 2021 and U.S. Provisional Application No. 63/347,331, filed May 31, 2022, the contents of which are entirely incorporated by reference herein.

FIELD

Described herein is a device to allow pigs and other animals to self-apply biological products and to provide environmental enrichment to reduce behavioral problems and save labor.

BACKGROUND

Labor is both costly and in short supply in agriculture and other industries. Workers are simply not available to perform animal health observations and to administer drugs, pheromones, insecticides, vaccines, hormones, or other animal health products. In addition, detection of estrus in weaned sows is a challenge, and the challenge is greater if the sows are in a group pen using current equipment and production systems. Moving boars through groups of sows is more difficult than running them down an aisle to achieve nose-to-nose contact. European law and California's Prop 12 requires sows to be group housed from weaning.

Environmental Enrichment (EE) is required on farms in some countries and by some USA companies. However, many EE devices do not take advantage of animals' natural behaviors, nor do current EE devices provide a multi-sensory enriched experience. For example, several methods of EE used in practice for pigs include hanging ropes, chains, hoses and cloth along with toys like balls and plastic toys that are on the floor or ground. Use of these enrichment methods fail to maintain animal interest over time because they are stagnant, non-manipulable enrichment that does not provide much animal feedback to maintain interest.

Therefore, there is a need for a device and method that is interesting to the animals so as to allow animals to entertain themselves (thus solving behavioral problems) and that self-administer biological products for the animal's health, detection of estrus, or application of animal health products while at the same time providing environmental enrichment for animals with minimal or no human labor required.

SUMMARY

The Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect of the present disclosure provides a self-sprayer device for self-administering an animal product to an animal. The device includes a pushing plate comprising a sprayer hole and a hinge; one or more side plates connected to the pushing plate, the pushing plate and the one or more side plates forming a top opening; and a base plate extending from the bottom of the pushing plate. The pushing plate is operable to move by the animal, via the hinge, and release the animal product through the sprayer hole.

In some aspects, the device further includes a bottle or plumbed line to a larger container operable to hold the animal product and/or a bottle holder operable to hold the bottle. The bottle or plumbed line includes a nozzle operable to trigger the release of the animal product from the bottle and through the spraying hole.

In additional aspects, the device further includes an engagement item operable to provide environmental enrichment to the animal. The engagement item may be connected to one or more slots on at least one of the one or more side plates. Non-limiting examples of the engagement item include one or more ropes, rubber materials, plastic materials, rods, chains, or toys.

In an aspect, at least one of the one or more side plates comprise one or more attachment points operable to connect the device to a wall, post, or fence.

In another aspect, the device further includes a photocell operable to trigger release of the animal product when the animal breaks a photo beam from the photocell.

In further aspects, the pushing plate is round, rectangular, or any shape that accommodates an animal's snout or face.

In some aspects, the animal is a pig.

In various aspects, the animal product is selected from the group consisting of drugs, antibiotics, vaccines, insecticides, pheromones, and other animal health products. The animal product may further include a dye. In some examples, the animal product may be a maternal pheromone and the device may be used to reduce fighting, increase feeding, or stop tail biting, ear chewing, ear necrosis, or belly nosing. In other examples, the animal product may include Boar Better® pheromone and the device may be used to induce estrus in a pre-pubertal animal or identify an animal in estrus. In another example, vaccines may be self-administered using the device.

In some aspects, the self-sprayer device may further include a dimple with a hole on the base plate and a collection vial below the base plate and under the hole in the dimple, wherein the dimple and the collection vial are operable to collect an oral fluid sample from the animal.

Another aspect of the present disclosure is a method of self-administering an animal product to an animal. The method may include placing a self-sprayer device in a pen keeping the animal, and releasing the animal product through the sprayer hole when the animal moves the pushing plate.

In some aspects, the method further includes providing a multi-sensory, biologically appropriate environmental enrichment to the animal, wherein the device further comprises an engagement item.

In an aspect, the animal product comprises a pheromone and a dye. The method may further include inducing and/or determining estrus in a pre-pubertal animal based on the amount of dye sprayed on the animal's face. The method may further include identifying that the animal is in estrus based on the amount of dye sprayed on the animal's face.

In some aspects, the method may further include collecting an oral fluid sample from the animal in a collection vial below a dimple on the base plate.

BRIEF DESCRIPTION OF THE DRAWINGS

The accompanying Figures and Examples are provided by way of illustration and not by way of limitation. The foregoing aspects and other features of the disclosure are explained in the following description, taken in connection with the accompanying example figures (also "FIG.") relating to one or more embodiments, in which.

DETAILED DESCRIPTION

Figure 1A:
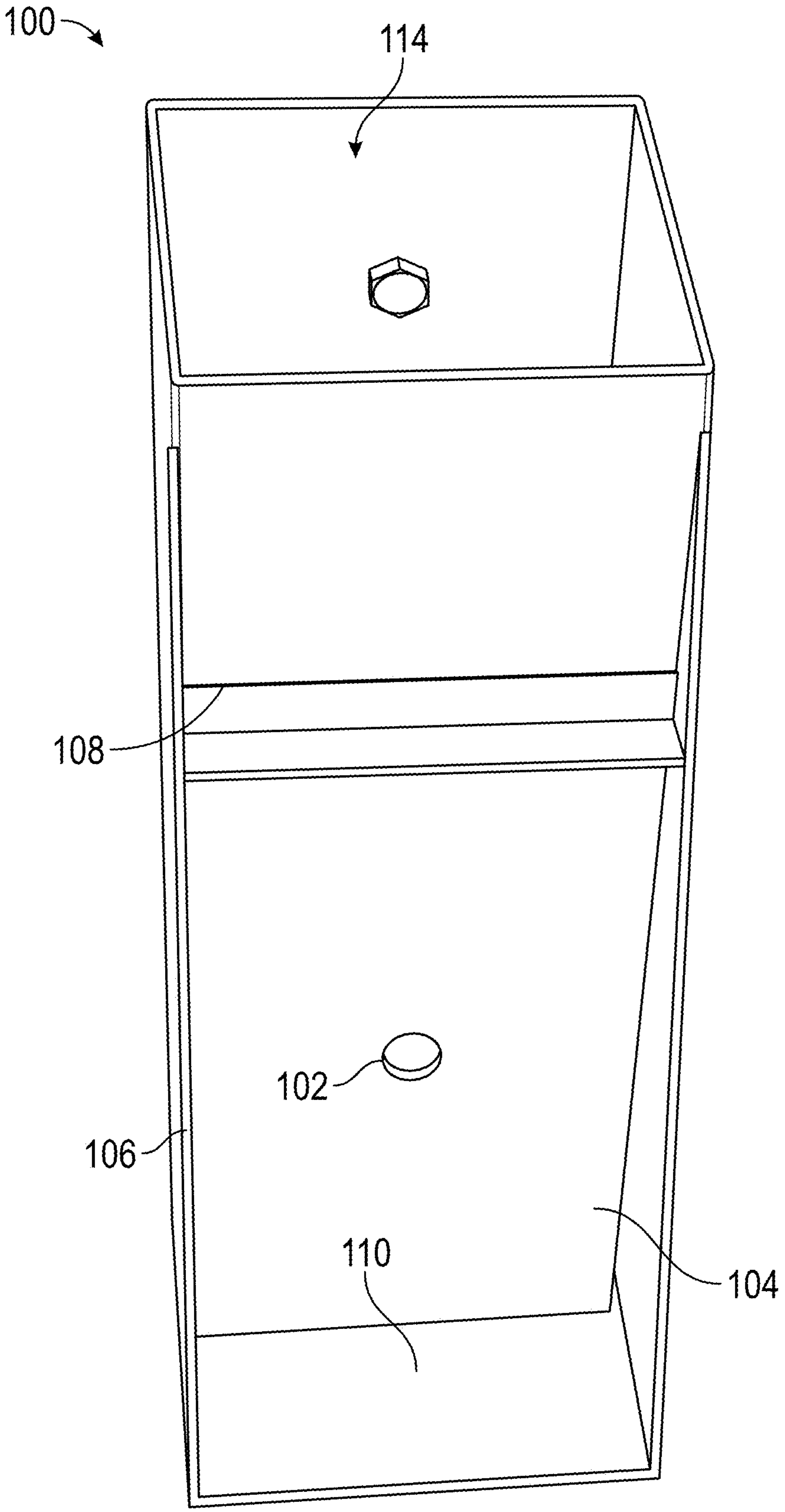
FIGS. 1A, 1B, 1C, 1D, 1E, and 1F show an example self-sprayer device in an embodiment.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Moreover, the present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

According to one aspect of the present disclosure, a device to deliver both environmental enrichment (EE) and healthful animal biological products without requiring human application of products is described. This saves labor in allowing the animals to self-apply products rather than having to catch, restrain, and inject each animal. Non-limiting examples of animals that may use the device include pigs, sows, gilts, horses, dairy and beef cattle, sheep and goats, poultry (turkey, meat chickens, egg-laying hens), companion animals, domesticated animals, zoo animals, farm animals, and other wildlife or similar animals. Slight modifications to the self-sprayer device are contemplated to accommodate for differences between specific animals.

The self-sprayer device may be modified to be easier or harder for the animals to work, thereby changing the dose or concentration of product or enrichment delivered. For example, the shape, size, pressure needed, bottle, and spray nozzle size can all be adjusted to achieve the desired product delivery volume. Or, if more time is desired for animals to interact with the device, making the device easier to use will increase the volume delivered. The device may be a purely mechanical device that engages the animal appropriately without over-use. For example, some animals using the device may self-remove less than 2 liters of product in 12 hours, but every animal contained with the device may use the device every day. However, if greater device use is desired, an infrared beam from a photocell can be added that when broken and with no animal pressure, can deliver an enrichment experience or an animal health product. Provided herein are both a mechanical (no external power needed) device and an electric device that is triggered by breaking a non-visible beam of light. The device may be not powered, or it can be powered by battery, electricity, water, steam, combustion engine, or any other power source.

The device provides many advantages over-using labor on a farm to administer products and/or provide EE by taking advantage of animal natural behaviors. For example, the device allows animals to self-apply products, thus reducing labor needs on the farm, the device allows animals to have a stress-free product delivery (e.g. one doesn't need to restrain animals to make injections), the device treats individual pens of animals with products (rather than a whole barn as when products are added to the feed or water), and the device provides physical/tactile, olfactory, behavioral, taste, and auditory EE. While significantly reducing labor, the device allows for more timely animal health and behavior assessments and deliver therapies on a pen level if desired (rather than a barn-level). In addition, the device provides for additional enhancements, such as attachments to the device to make it more or less interactive, food coloring can be added to the spray to indicate which animals have been sprayed, or added technology such as facial recognition, body weight estimation, or animal health and welfare assessments. In addition, providing a clean (off the floor) device to manipulation in a natural manner may be sufficient to reduce some behavioral problems such as tail biting, and then liquids, powders, gels, or other material can be applied as needed. While the device can be used with no animal health product to provide multi-sensory EE, biological products may be added when needed to prevent or treat animal health or behavioral problems.

FIGS. 1A-1F illustrate an example self-sprayer device 100. The self-sprayer device 100 includes a sprayer hole 102 in the center of a pushing plate 104 on the front of the self-sprayer device 100. The location of the spray hole can vary to spray on the animal's face or it can be positioned so that animals self-administer intranasal animal health products. As an animal pushes below the sprayer hole 102, the self-sprayer device 100 manually triggers a spray of a liquid animal product through the sprayer hole 102. The sprayer hole 102 may be located at a position on the pushing plate 104 such that the animal product is sprayed directly in the animal's nostrils. In various embodiments, the liquid spray may include an animal product to be delivered to the animal. Animal products that can be self-delivered include, but are not limited to drugs, antibiotics, vaccines, antiparasitics, insecticides, hormones, pheromones, and other animal health products. Pigs, as an example, may use the self-sprayer device 100 each day, multiple times, even without the liquid spray (no spray). With the spray available, the animals may self-apply the liquid spray, which alone is entertaining to animals. With regular use of the device, an animal health product may be easily added when needed.

Figure 9:
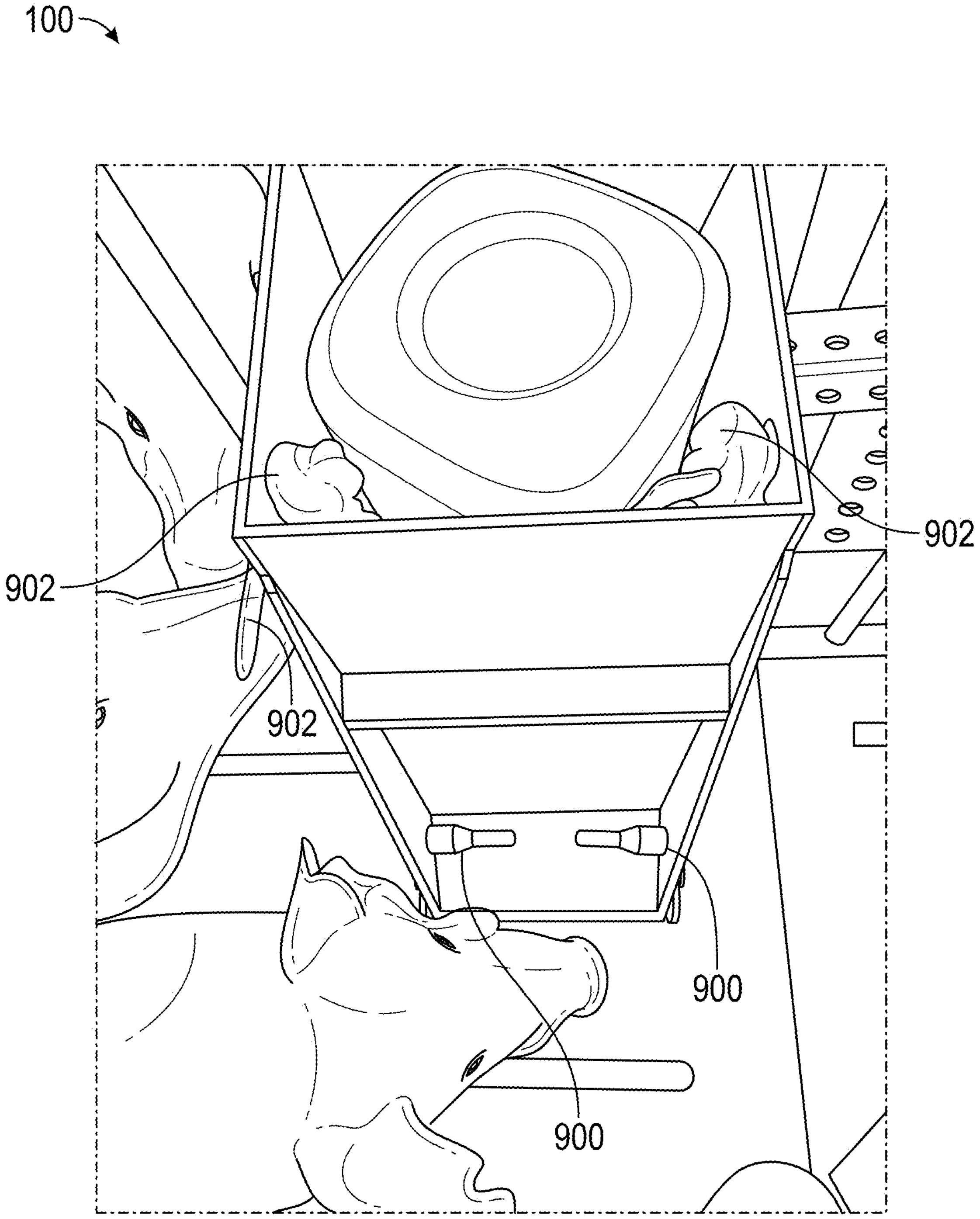
FIG. 9 shows an example self-sprayer device in an embodiment.

The self-sprayer device 100 may further include one or more side plates 106 connected to the pushing plate 104. In some embodiments, one or more engagement items, such as ropes, rubber, or plastic can be added to any side plate 106 to increase animal interest. For example, as illustrated in FIG. 9, the engagement items 900, 902 can include one or more ropes 902 hung from the one or more slots (e.g., slots 112 illustrated in FIG. 1B). For example, as illustrated in FIG. 9, one or more chewable materials 900 (ex., plastic, rubber) may be added to one or more side plates 106 of the self-sprayer device 100. In some examples, one or more chewable materials 900 can be on an inner surface (e.g., the surface proximal to or closer to the pushing plate 104) of the one or more side plates 106. In further examples, toys, such as rope toys, rods, or chains may be hung from the self-sprayer device 100 using one or more slots 112 on the side plate 106. Further examples of engagement items include but are not limited to items that generate sounds, smells, or semiochemicals that engage the animal or other items that provide a variation in texture or motion for the animal. Other attachments can include an inter-pen rod that pigs in adjacent pens can use to play with their neighbors. Any of these engagement items may have animal products added to them as well to encourage animal interaction.

In an embodiment, the pushing plate 104 of the self-sprayer device 100 may further include a hinge 108. In some aspects, the hinge 108 at the top of the pushing plate 104 and connects the pushing plate to a smaller side plate 106. The hinge 108 allows pushing especially near the bottom of the pushing plate 104. The hinge 108 may include a spring to control the motion of the pushing plate 104. The pushing plate 104 can be made easier or more difficult to push, which changes the amount of product material that is delivered. This allows for a dose the product to be titrated as needed.

In various embodiments, the pushing plate 104 may be round, circular, rectangular, square, triangular, or any geometric shape that accommodates an animal's snout or face. In some examples, the shape of the pushing plate 104 may be adjusted to change the level of engagement from the animal. The pushing plate 104 may be smaller than one or more side plates 106. For pens containing larger numbers of animals (more than 10 for example), multiple devices can be placed in each pen.

In an embodiment, extending from the bottom of the self-sprayer device 100 at the lower end of the pushing plate 104 is a base plate 110. In some embodiments, the base plate 110 is operable to hold or support treats, soil, sand, food treats such as peanut butter or similar desirable food treats, or other manipulable material. The base plate 110 may be supported by a triangular extension of a side plate 106, as seen in FIG. 1B.

In an embodiment, the pushing plate 104 and the one or more side plates 106 may form a top opening 114 of the self-sprayer device 100. The top opening 114 may be operable for inserting a bottle 118 containing the animal product to be sprayed through the sprayer hole 102 into the body of the device 100. The self-sprayer device 100 may be completely open at its top end to form the top opening 114. The body of the device may be hollow and operable to receive the bottle 118, via the top opening 114.

In some examples, the bottle 118 may contain a liquid, gel, gas, or powder animal product. In additional examples, the animal product in the bottle 118 may further include a dye such that the animals that have been sprayed can be easily identified. The bottle 118 may include a spraying tip/nozzle to trigger release of the animal product from the bottle 118. The bottle 118 clicks in place behind the pushing plate 104 that provides pressure to squeeze the spraying tip/nozzle and trigger a spray of the animal product. The bottle 118 may be connected to the spraying tip/nozzle near the sprayer hole 102. In various examples, the bottle 118 may be a half-gallon bottle, a one-gallon bottle, or a two-gallon bottle. The self-sprayer device 100 may be calibrated to deliver up to about 2 mL, 3 mL, 4 mL, 5 mL, or greater than 5 mL per squeeze of the trigger. The volume of the animal product delivered may be adjusted based on the type of animal using the device and the specific animal product being delivered. In addition, for barns and pens containing large numbers of animals, a central source of animal health products can be delivered to each device.

In additional embodiments, a microneedle system may be attached to the self-sprayer device to allow animals to rub against it to deliver intradermal vaccines or drugs.

In various embodiments, the self-sprayer device 100 may have a height ranging from about 4 in to about 36 in (depending on the size of animal), a width ranging from about 2 in to about 24 in, and a depth ringing from about 5 in to about 15 in. In some aspects, the pushing plate may have a height ranging from about 10 in to about 15 in and a width ranging from about 5 in to about 10 in. The device height can be adjusted to the height of any animal so that it is convenient for them to activate and interact with the device.

The self-sprayer device can be made more or less attractive to animals so that the rate of spraying can increase or decrease, by making the device harder or easier to push, adding an attractant pheromone (Maternal Pheromone), adding-on features including ropes, moving pipe, or other manipulable material, and/or adjusting the dose of the animal product to not waste product. The device is flexible in that it may be mechanical (requires no electricity) or have an electronic sensor (e.g. photocell) and can be used with or without enhancements to increase or decrease the device use. The end user can titrate the level of device use depending on the objective (to reduce behavioral problems or to apply a biological product). Furthermore, more than one level of attraction can be used over time. For example, the device alone may provide enrichment and animal activities, which has benefit to the animals and their owners. However, while the device may be used to provide EE, additional animal health products may be added as needed. In some examples, the device may further include a camera to monitor which animals have interacted with the device and how often. When the camera is attached to an online source, general animal health, body weight and individual animal identification can be assessed remotely.

Figure 2A:
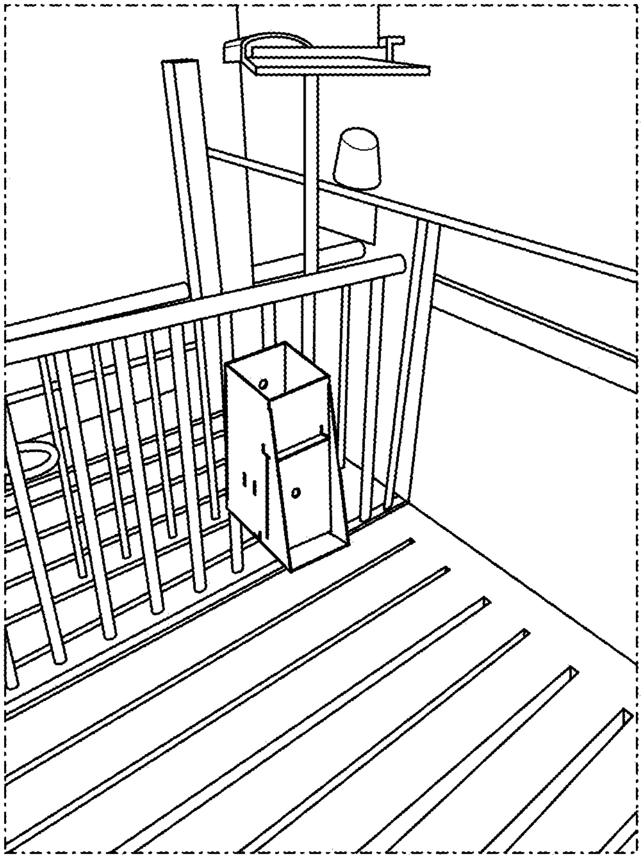
FIGS. 2A, 2B, 2C, 2D, 2E, and 2F show an example use of the self-sprayer device of FIGS. 1A-1F.
Figure 2B:
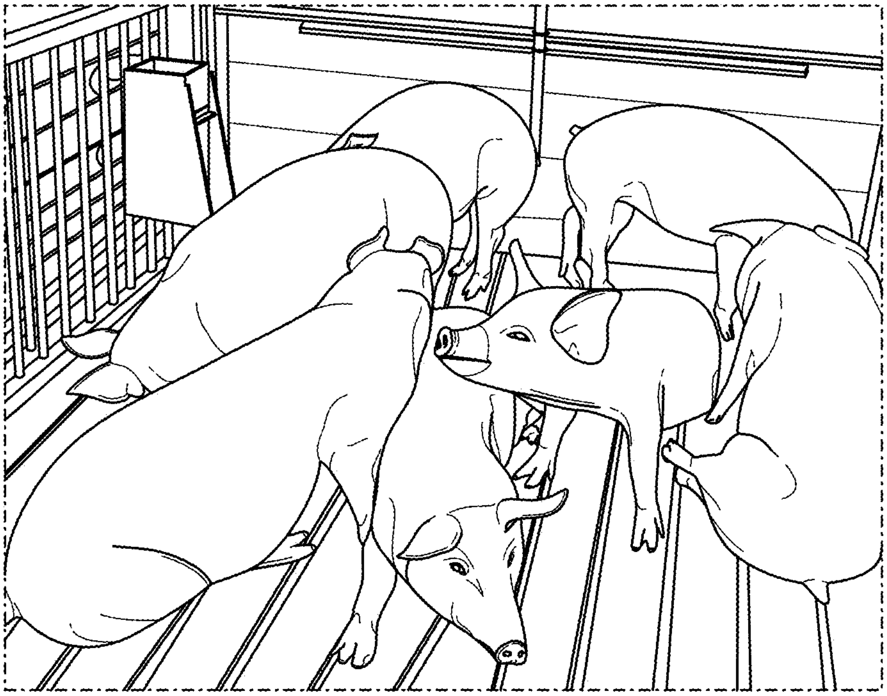

Referring now to FIGS. 2A and 2B, additional details of the self-sprayer device 100, in use, are shown. The self-sprayer device 100 is operable to be mounted to a wall or fence, via one or more attachment points 116 on a side plate 106. In an example, the one or more attachment points 116 may be located on a side plate 106 opposite the pushing plate 104. The attachment points 116 may allow for the device to be tied, clipped, or otherwise attached to the wall or fence. This provides a benefit as the device takes no floor space and does not interfere with other equipment in the pen. A colored dye sprayed with the animal product can be seen on the pigs that were recently sprayed in FIGS. 2B-2F.

Figure 4:
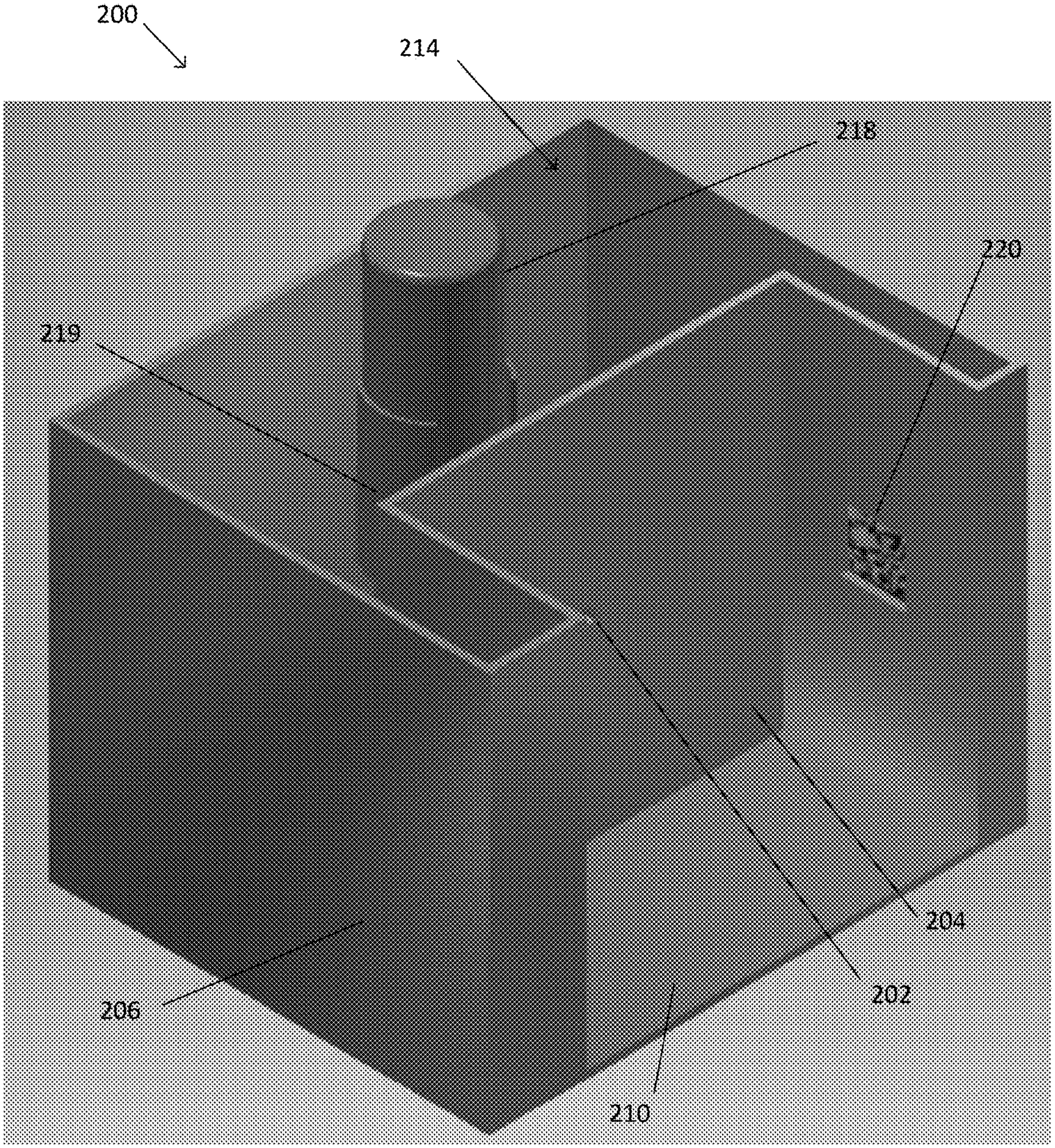
FIG. 4 shows an example self-sprayer device with a photocell in an embodiment.
Figure 5:
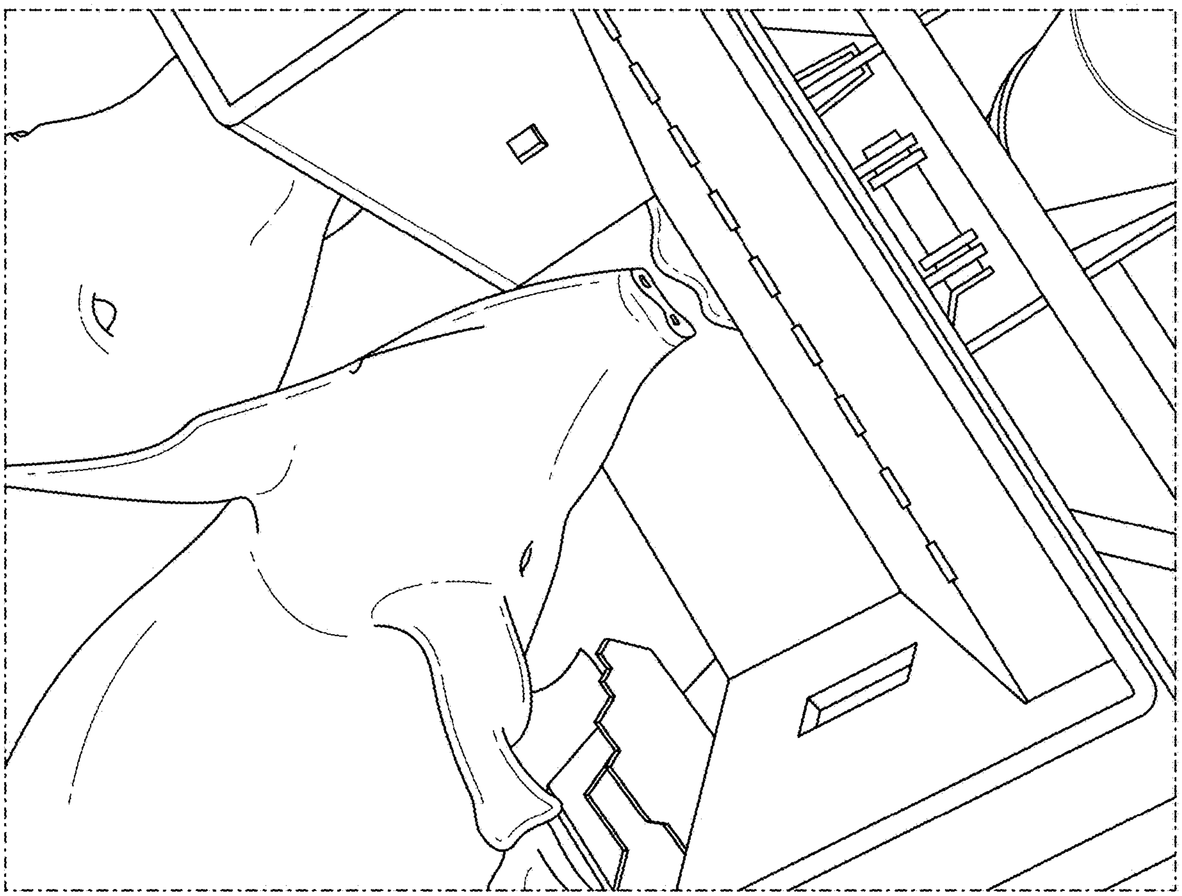
FIG. 5 shows an example use of the self-sprayer device of FIG. 4.

FIG. 4 illustrates an additional embodiment of the self-sprayer device 200 and FIG. 5 shows the self-sprayer device 200 of FIG. 4 in use. In an embodiment, the self-sprayer device 200 includes a sprayer hole 202, a pushing plate 204, side plates 206, a base plate 210, a top opening 214, a bottle 218, a bottle holder 219, and a photocell 220. In this embodiment, the self-sprayer device 200 uses the photocell 220 to activate the sprayer and thus uses power and electronic components. In some examples, this self-sprayer device 200 may be used when one wishes to increase the rate of spraying. The self-sprayer device 200 sprays when the animal breaks a photo beam, regardless if it touches the pushing plate 204. The spray can also be triggered by pushing the pushing plate 204. This embodiment of the self-sprayer device 200 may be useful when multiple treatments of a product are needed.

In additional embodiments, the self-sprayer device may further include electrical components including but not limited to at least one processor, a wireless transceiver, a battery, and/or one or more additional sensors. In some examples, the self-sprayer device may be operable to communicate with other smart barn technologies via the electrical components. For example, the sensors may monitor usage of the device, the processor may receive usage data from the sensors, and the wireless transceiver may transmit the data to one or more other devices. In some aspects, the data may be used to make adjustments to the amount of animal product being delivered, the type of animal product, and/or the type of EE being used.

FIG. 5 is a cutaway view of another embodiment of the self-sprayer device 300 with a round pushing plate 304. In an embodiment, the self-sprayer device 300 includes a sprayer hole 302, a pushing plate 304, side plates 306, a top opening 314, a bottle 318, and attachment points 316. In some examples, the pushing plate 304 may be more difficult to push and thus, pigs may play with it less often than with the self-sprayer device 100 of FIGS. 1A and 1B. Having a self-sprayer device 300 that is more difficult to push may be beneficial in some applications that require a smaller volume of liquid to be administered which is useful in not wasting or over-applying valuable products.

In some embodiments, the self-sprayer device may further include a mechanism for collecting oral fluids from the animal. Veterinarians and farm owners collect oral fluids, such as saliva, to assess pig health. For example, typical methods to collect oral fluids from pigs include holding a cotton rope in a pen. Pigs then use an unnatural behavior (pulling from above) while chewing the rope. They deposit oral fluids that can be squeezed out of the rope and assayed for disease and other molecules. This is time consuming and not 100% effective (not all pigs chew on the ropes).

Because the animals using the self-sprayer device are mechanically activating the device, it is highly likely that saliva from an animal interacting with the device will be in contact with the device. A mechanism for collecting oral fluids may be any shape that allows accumulation of a sample of the oral fluid for later collection. In some embodiments, the self-sprayer may include a lip 904 on the pushing plate or base plate to allow oral fluids to collect, as illustrated, for example, in FIG. 9. For example, the lip 904 can form a recess 906 in the base plate 110 where the oral fluids can collect. At a later time, a technician can collect fluids from the recess 906 in the base plate 110 defined by the lip 904 using a syringe or other collection mechanism.

Figure 8:
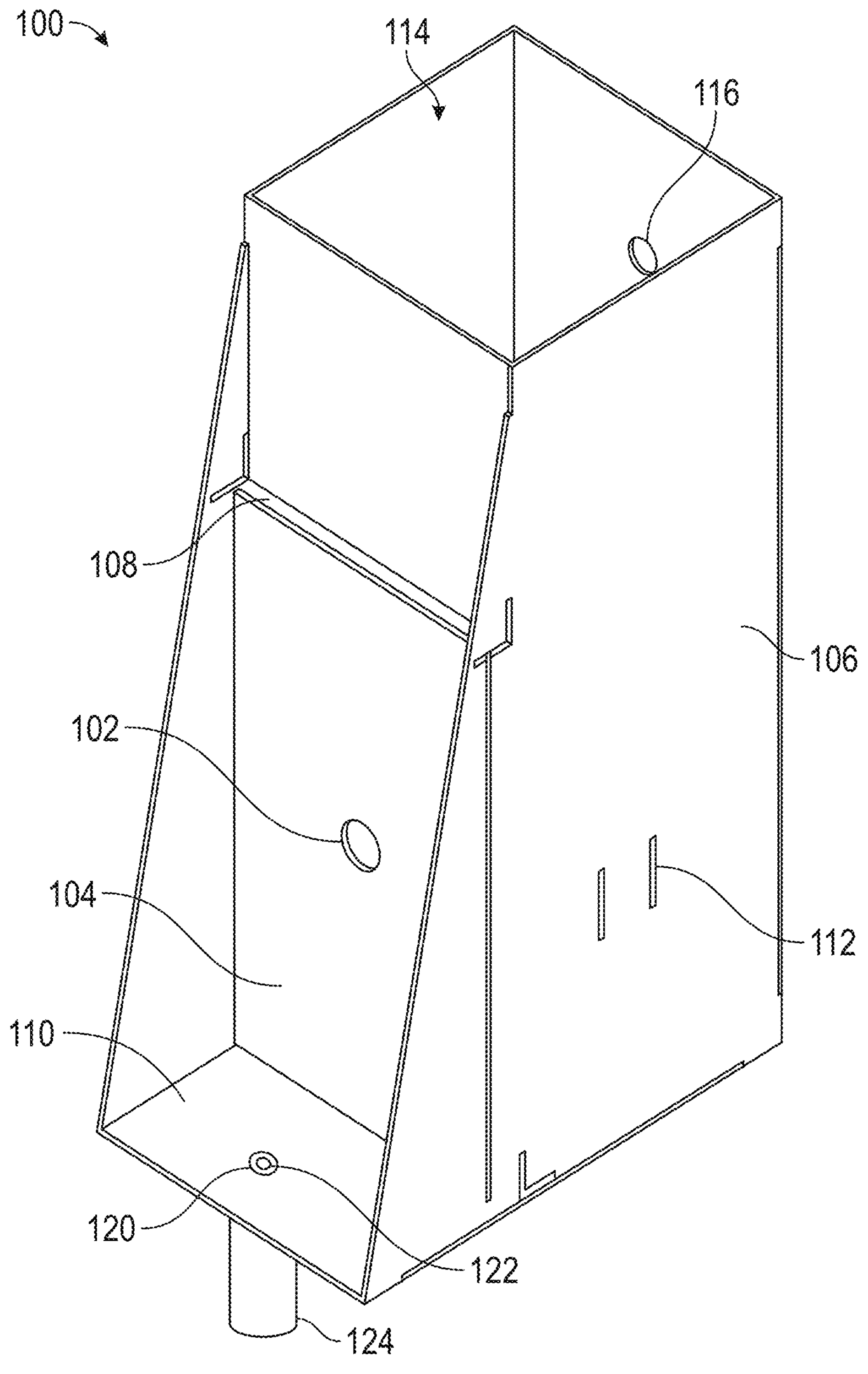
FIG. 8 shows an example self-sprayer device in an embodiment.

In another embodiment, the pushing plate 104 or base plate 110 may include a dimple 120 or recess to allow oral fluids to accumulate at the base plate 110, as illustrated, for example, in FIG. 8. In some aspects, a hole 122 may be located in the dimple 120 or recess to allow drainage of the oral fluids collecting in the dimple 120 or recess, as illustrated, for example, in FIG. 8. A collection vial 124, such as a test tube, may be placed underneath the hole 122 and the base plate 110 to collect the oral fluids draining from the dimple 120 or recess via the hole 122, as illustrated, for example, in FIG. 8. At a later time, a technician can simply take the collection vial 124 to the laboratory for analyses. In some examples, the collection vial 124 can be coupled to the hole 122 via a coupling mechanism. In some examples, the collection vial 124 can have threads operable to screw into corresponding threads in the hole 122. In some examples, the collection vial 124 can couple to the hole 122 via a snap-fit mechanism. In some examples, other coupling mechanisms may be used to couple the collection vial 124 to the hole 122.

In some aspects, the collection vial can be protected from the animal. For example, the collection vial 124 can be protected from the animal because it is below the base plate 110 of the self-sprayer device 100. By locating the collection vial 124 below the base plate 110, the animals are less likely to contact the collection vial 124. In other examples, the self-sprayer device 100 can be located such that the collection vial is located underneath a floor where the animals stand. For example, the base plate 110 can rest on the floor of a stable, pig pen, or other area where animals are located. The collection vial 124 can fit into a hole in the floor, such that the animal cannot contact the collection vial 124. In some examples, the self-sprayer device 100 can have additional protective panels extending downward from the base plate 110 and surrounding the collection vial 124 such that the protective panels prevent an animal from contacting the collection vial 124.

Another aspect of the present disclosure provides methods of using the self-sprayer device to provide quality, clean environmental enrichment, to allow an animal to self-deliver an animal product, and/or to provide behavioral management (to change behavior, such as reducing fighting or encourage the expression of sexual behaviors or increase feeding).

In an embodiment, the device may be used to provide multi-sensory, biologically appropriate EE to animals at a desired level. For example, the device may be used as an Environmental Enrichment device to satisfy laws in Europe and Canada and as required by some USA food retailers.

In some embodiments, the device may be used to stop behavioral problems like tail biting, ear chewing, ear necrosis, belly nosing or other unwanted behavior young pigs, gilts, or sows by using the device and a maternal pheromone (MP) or other product. In additional examples, the device may be used to reduce fighting and increase feeding in weaned pigs using the MP.

In some embodiments, the device may be used to induce and identify estrus in pre-pubertal animals. By applying the boar pheromone (e.g., BoarBetter® (BB)) every day to pre-pubertal females, young females may come into estrus. For example, the device may be used to allow gilts to self-apply BoarBetter® (BB) pheromone to accelerate the onset of estrus and to indicate which females are in estrus. Workers may find it easy to arrive at work and immediately see which animals are in estrus without touching the animals or without the need to move adult males near the females that might be in estrus. Heat detection by humans would thus require less time if one can see which females are in estrus without doing any additional work.

Figure 2C:
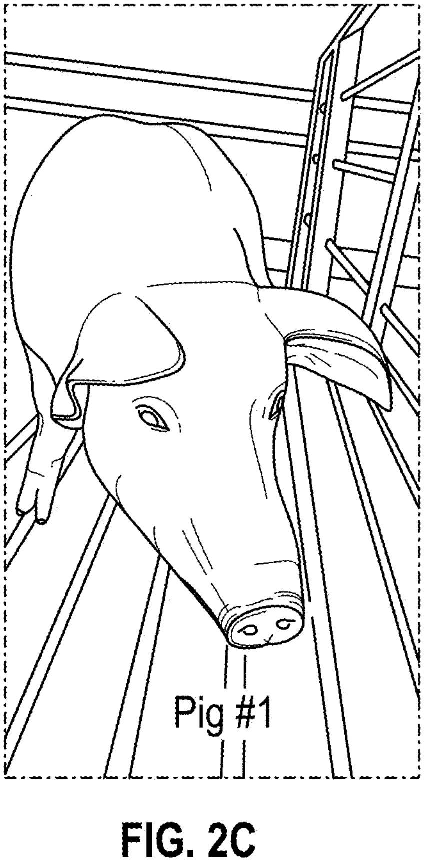
Figure 2D:
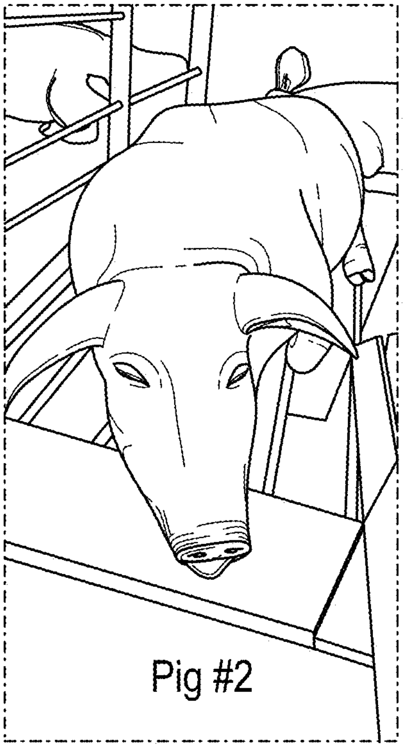
Figure 2E:
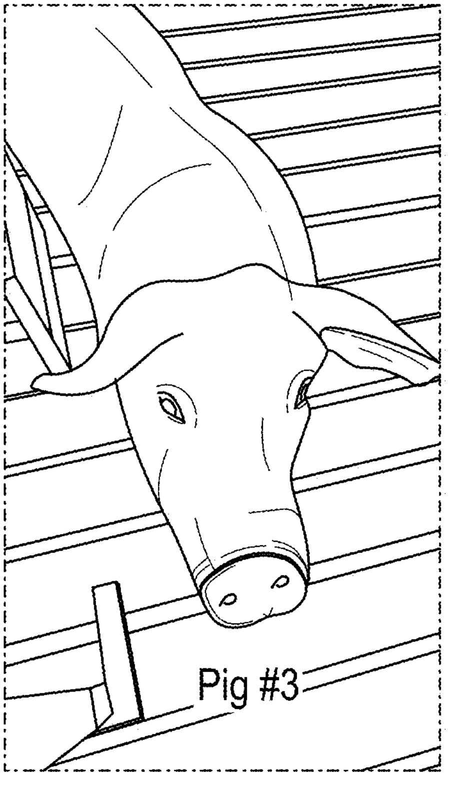
Figure 2F:
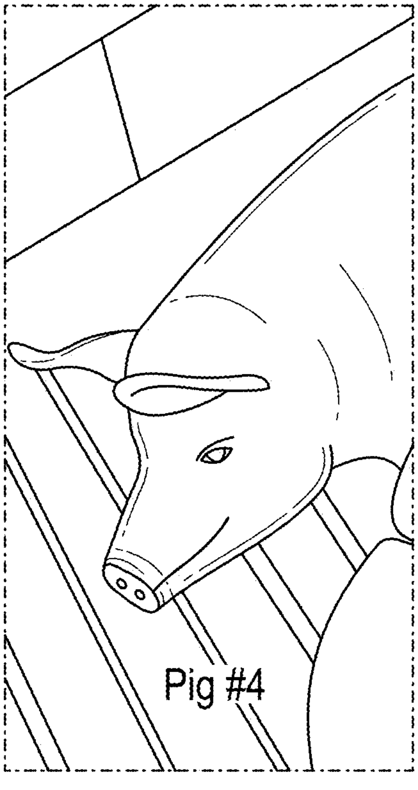

In further embodiments, the device may be used to identify an animal in estrus among a group of non-bred or pregnant females. For example, the male sex pheromone may be placed in the device. Females that interact at length with the device (that contains a male pheromone) will have more colored spray on her face than a female not in estrus. In another example, the device may allow weaned sows (or other species) in group pens to show when they are in estrus because a sow in heat will play with the device more when it contains BB and thus will have a blue nose/face. The worker can easily see which sow is in estrus prior to breeding. For example, FIG. 2C shows a sow in estrus and FIG. 2E shows a sow not in estrus.

In other embodiments, the device may be used to apply any biological product by allowing the animals to self-apply a product (antibiotics, insecticides, antiparasitic, oral vaccines, intranasal vaccines, hormones, etc.) at a desired dose. The device can be made more or less interactive to regulate the dose.

In additional embodiments, the device may be used to collect oral fluid samples to assess animal health. For example, after an animal has interacted with the device, saliva from the animal may be collected in a dimple or other collection mechanism on the device and stored in a collection vial via a hole. The saliva sample may then be retrieved from the collection vial for analysis.

Another aspect of the present disclosure provides all that is described and illustrated herein.

EXAMPLES

Example 1

The device of FIG. 2A was tested to determine if every pig used the device every day. The overall goal was to apply BoarBetter® (BB) in a simple, automated way such that sows in heat were motivated to obtain the BB more-so than sows not in heat. Because BB has a blue-green dye, one can see if a given sow is sprayed more often than other sows. It was hypothesized and confirmed that sows in heat will be more motivated to press the self-sprayer than sows not in estrus. If they do, then heat detection will be easier for the breeder without requiring additional labor, and in fact, labor needs should be reduced. Likewise, if the desire is to calm pigs that begin expressing undesirable behaviors (such as tail biting), the MP can be added to calm pigs.

The study was conducted at the Texas Tech New Deal Research Farm. Four sows (numbered 1 to 4 with paint and designated here as sows A, B, C and D) were housed in a pen in the gestation barn. Three of the sows were pregnant. One sow was placed in the pen directly after weaning (expecting that by days 4 or 5 she will exhibit behavioral estrus). The initial observer was blind to treatment groups of sows, however, the weaned sow was noticeably thinner and as the study progressed, it was clear to even a casual observer which sow was in estrus. All sows had free access to water and were fed about 2 kg/d of gestation feed in a single meal.

The device was calibrated to self-deliver 4 mL per squeeze of the trigger. The gallon bottle contained BB. Two cameras were connected to a network video recorder. One camera viewed the entire pen and another was a close-up of the sprayer. Sows were marked with a black crayon with numbers 1, 2, 3 or 4 and were later dubbed A, B, C and D.

This study was conducted over a 7-day period. The sprayer device was mounted to the pen wall inside the sow pen at an angle that they could reach with their snouts. When they applied pressure, the sprayer delivered 4 mL. The spray bottle inside of the sprayer device contained the Boar Better Pheromone for the study duration. It was checked that BB was available and the cameras were functional each 12 hours for 7 days (weaning until 7 days later). Each day photos of the sows faces, head and check pheromone levels in the sprayer were taken.

Videos were observed using behavior software. The observer recorded the time each sow was in contact with the sprayer and the number of sprays delivered. Data were reviewed continuously and summarized as averages or totals per day. Data for days included each 24 h period for 7 days (168 hours of observation). Thus, day 1 refers to the time from weaning until 24 h later, and so-on through day 7 after weaning.

Figure 3A:
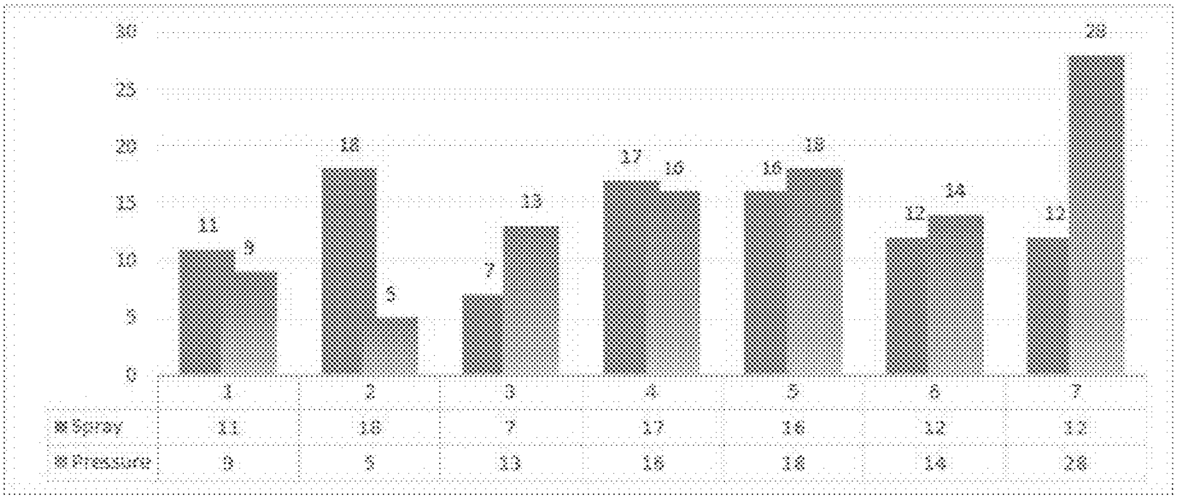
FIGS. 3A, 3B, and 3C are graphs showing the results of use of an example self-sprayer device.

The results for average use are provided in FIG. 3A. Each pig used the device every day. They were sprayed from 5 to 18 times per day. On average, the pigs pushed on the device 16.5 times per day and they received, on average, 11.4 sprays per day.

Sows A, B and D were pregnant and not in estrus. Sow C (also labeled #3) was weaned on day 0 and she was expected in estrus around days 4 to 6 after weaning. Sow D was in standing estrus in a weak way on day 4, but fully in standing estrus days 5 and early on day 6 after weaning. On day 7, she continued interacting with the device for about a day after she was no longer in full standing estrus.

Figure 3B:
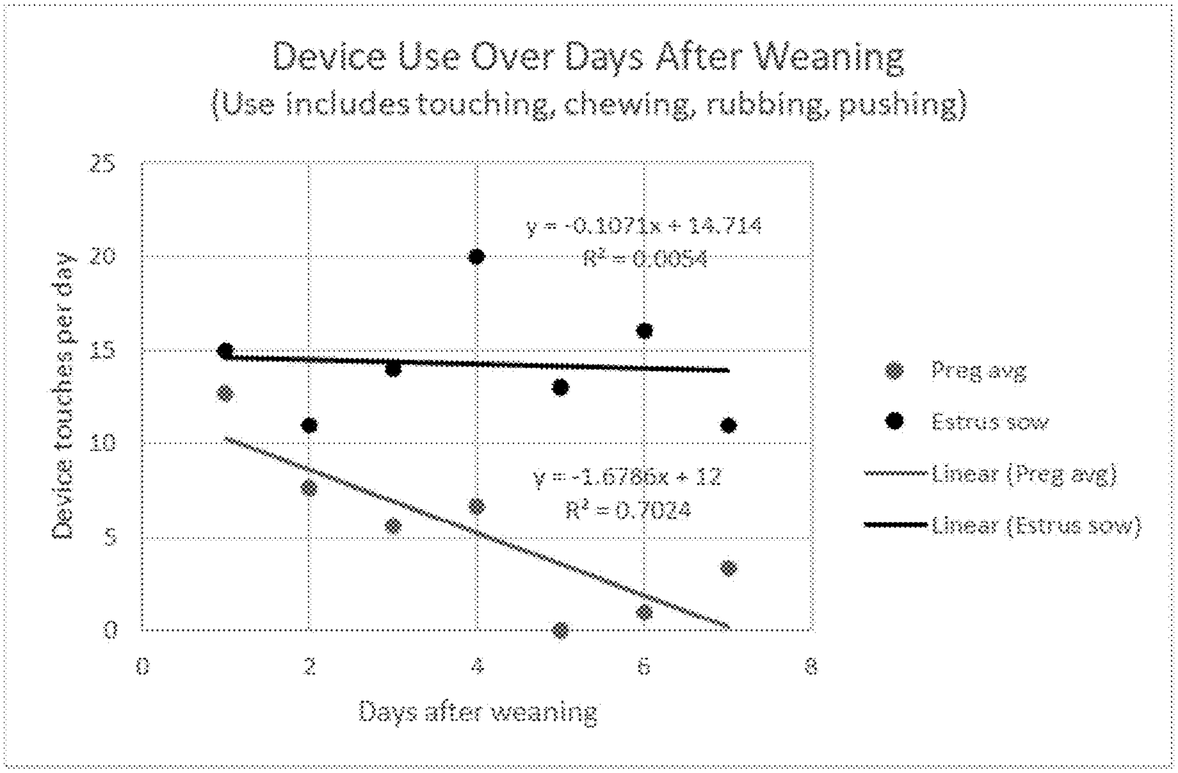

FIG. 3B shows that the pregnant (not-in-estrus) and the destined-to-be-in-estrus sow initially interacted with the device when it was novel. Data presented in FIG. 3B shows that on day 1, when all sows had first exposure to the novel device, all sows interacted with the sprayer. Among pregnant sows, the novelty wore off such that by day 5, the pregnant sows only occasionally interacted with the sprayer. Sow C (#3) maintained a high level of sprayer interactions each day. Sow C used the device most on d 4 after weaning (as she began to be in standing estrus). While all sows interacted with the device, the number of actual sprays differed among sows.

On day 3, Sow C showed signs of defending with the pheromone sprayer. She also slept next to the sprayer the evening of day 3 and prior to its heavy use starting on day 4. On the morning of day 4, the investigator entered the pen and applied the back pressure test on each sow. Sow C stood with back pressure for the first time (indicating she was coming into estrus). The breeder felt the sow's response was not strong enough for breeding until the morning of day 5 when she was bred. Sow C showed an increase in device use and sprays starting about 12 hours before she was in full standing estrus and continued for about 12 hours after she was not in standing estrus. Besides directly spraying the device, sows also experienced BB by licking and smelling BB from the floor and around the sprayer.

Figure 3C:
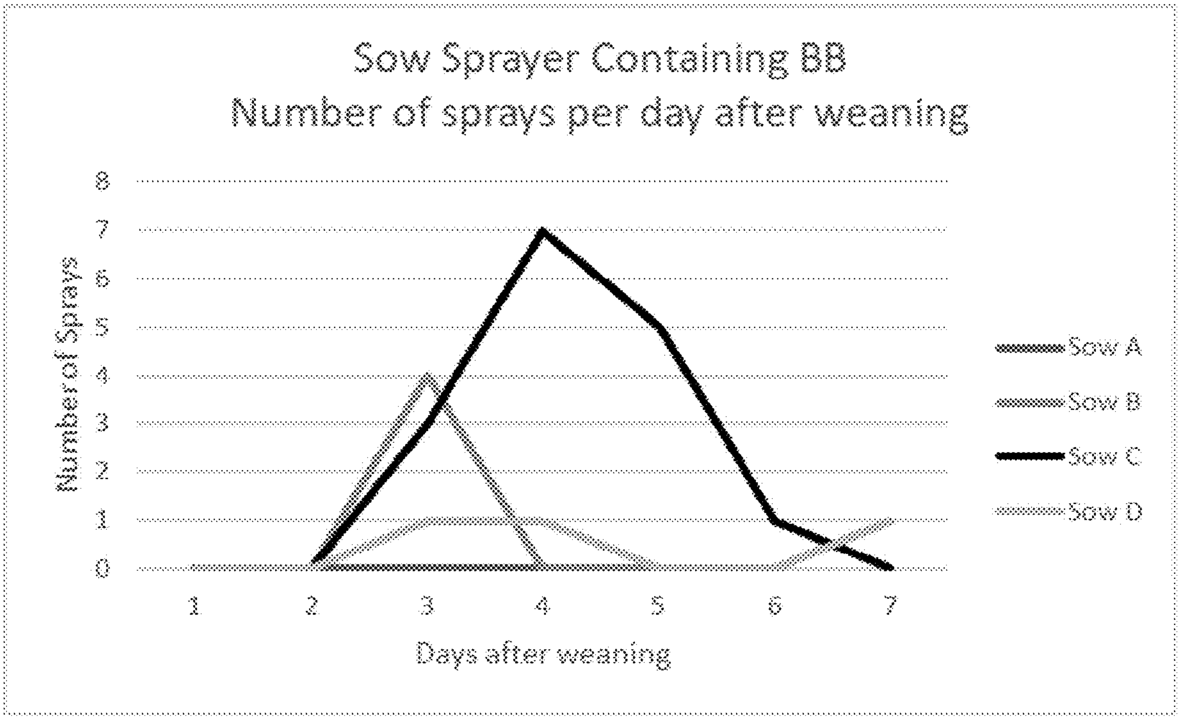

FIG. 3C shows the number of sprays delivered by sow pressing on the sprayer device by day after weaning. Sow C was the only sow in estrus. Apart from Sow B on day 3, pregnant sows caused very few sprays compared with the sow that was in estrus on days 4 to 6.

FIGS. 2C-2F are photos of each sow on day 4 after weaning. Sow #3 (also called C) was the only sow in estrus in this pen (the other sows are pregnant).

Example 2

Figure 1B:
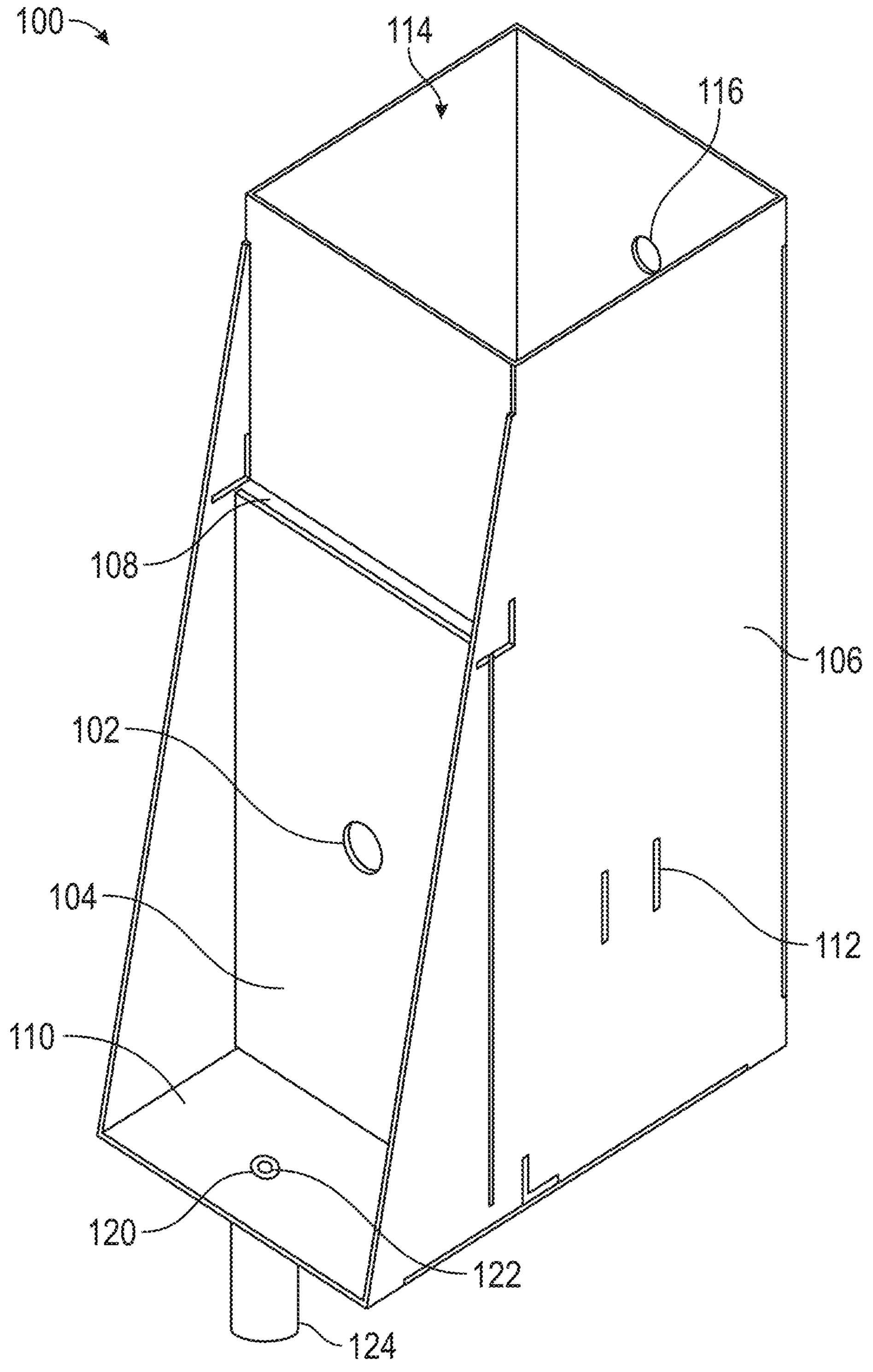
Figure 1C:
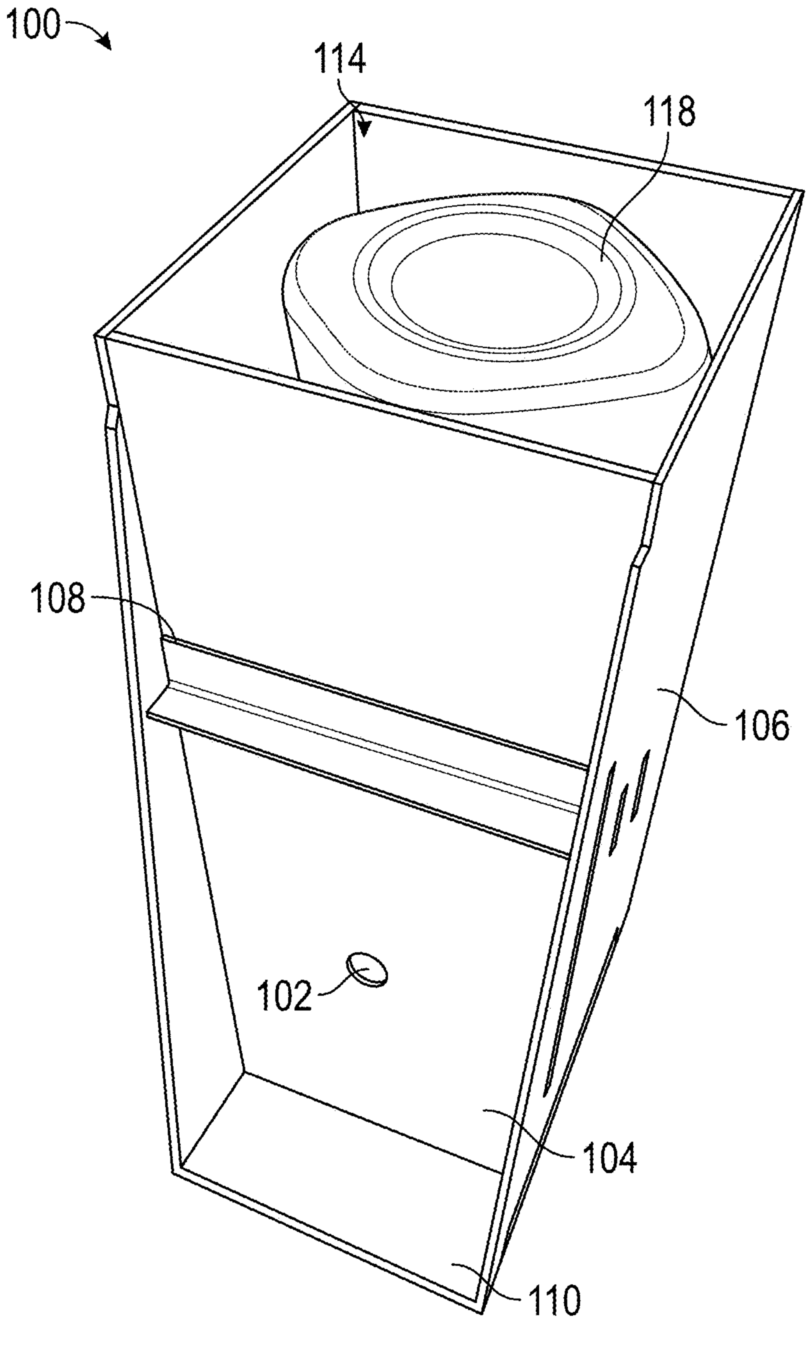
Figure 1D:
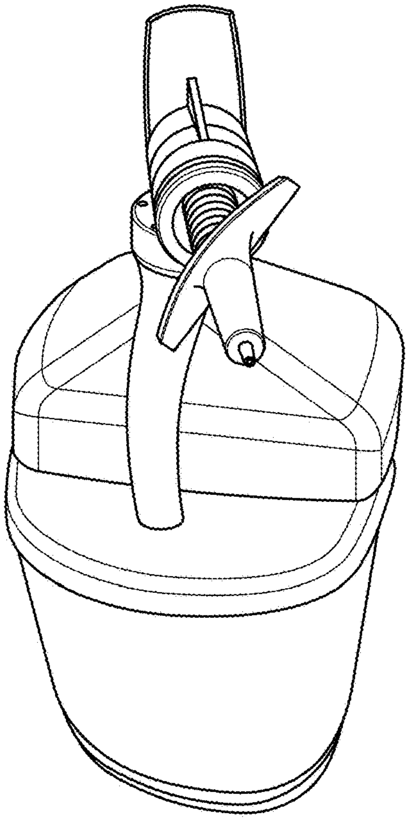
Figure 1E:
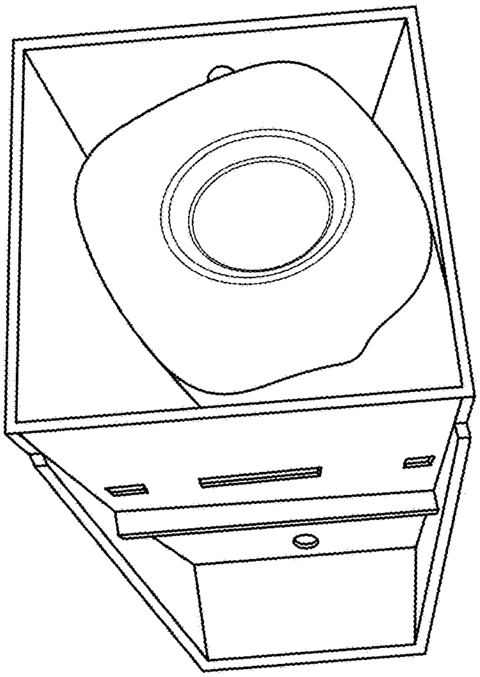
Figure 1F:
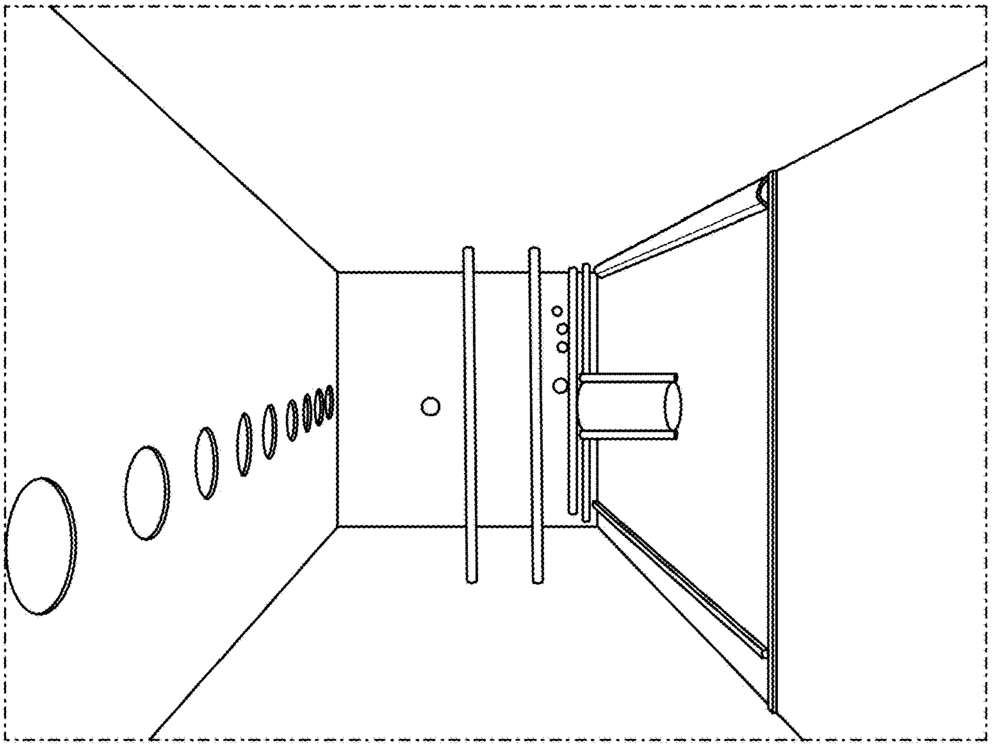

The device of FIG. 1A was tested to determine the number of sprays each pig received in a day. Results of the use of the sprayer device for self-application of a liquid pheromone are shown in Table 1 below. The average pig received 17 sprays per day and interacted with the device for over 37 minutes with an average time of device interaction of 2-3 minutes per day. That is, the average pig, with this device configuration, was sprayed at least 17 times during interactions that averaged 2-3 minutes per playing bout.

TABLE 1

| Measure | Number interactions resulting in a spray | Total daily duration, s | Total daily duration of interaction, min | Avg Duration per interaction, s |
|---|---|---|---|---|
| Average | 17.6 | 2247.2 | 37.5 | 162.9 |
| SD | 13.6 | 3167.3 | 52.8 | 171.6 |
| SE | 5.2 | 1208.9 | 20.1 | 65.5 |
| N pigs | 7 | 7 | 7 | 7 |

Example 3

Figure 6:
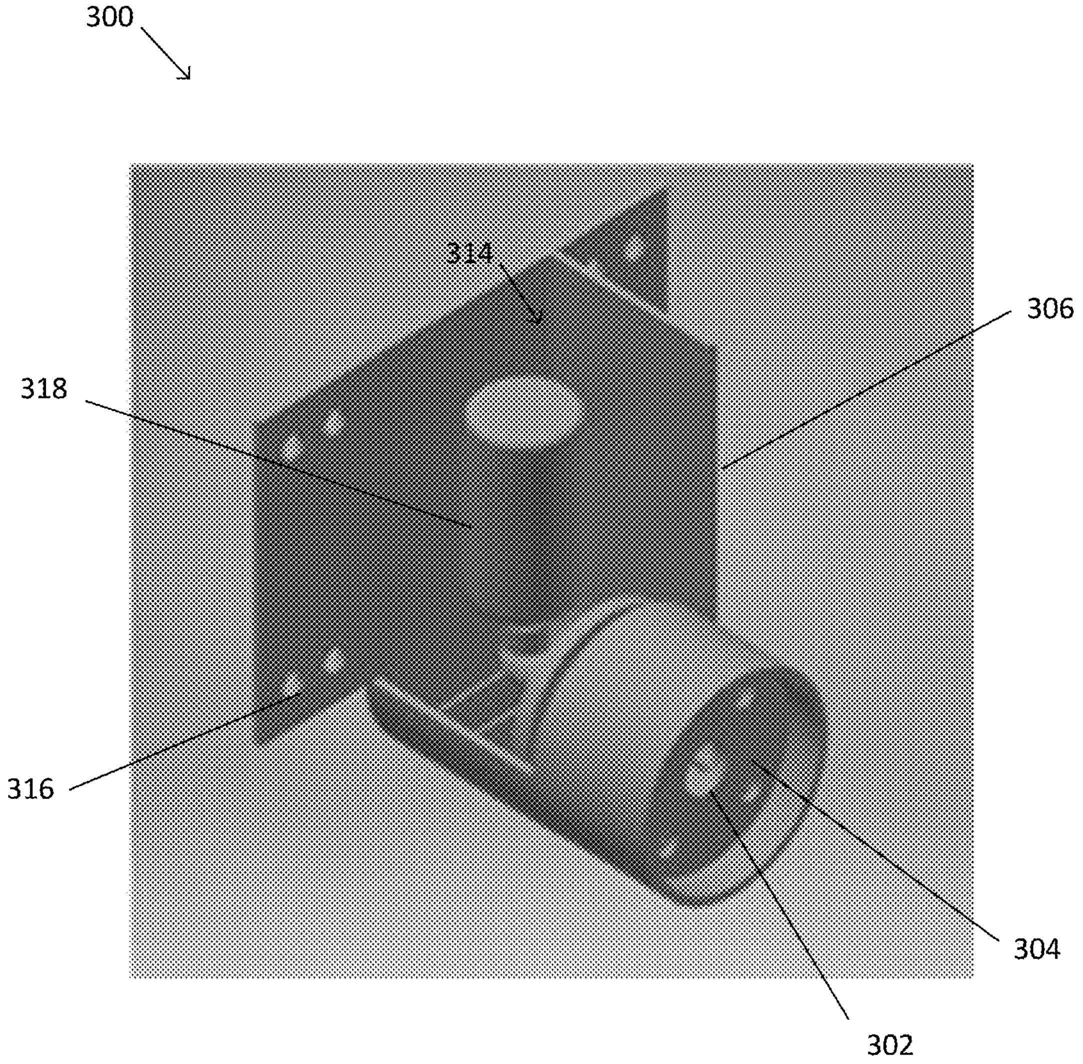
FIG. 6 shows an example self-sprayer device with a round pushing plate in an embodiment.

Nine pigs with access to the self-sprayer device 300 of FIG. 6 averaged 20.8 s interacting with the device. Although the interaction time was less than the device of FIG. 1A, it is noted that some applications require a smaller volume of liquid to be administered while other applications require a larger volume of animal health product delivery. Thus, this demonstrates that the shape, size, pressure needed, bottle and spray nozzle size can all be adjusted to achieve the desired product delivery amount. Or, if more time is desired for pigs to interact with the device, making the device easier to use will increase the volume delivered.

Example 4

The self-sprayer device was further tested to determine if pigs would self-administer a vaccine that would result in measurable antibodies in their blood and oral fluids. A commercially available Salmonella oral vaccine was used. 12 pigs per treatment were used with 3 treatment groups: control—no vaccine, label control—vaccine delivered by hand sprayer to each pig individually as per the approved label, and sprayer—vaccine delivered with the self-sprayer device.

Blood and oral fluids (saliva) from the pigs were collected at the start and after 14 and 21 days (when antibody levels peak). Two antibody types were assayed: IgG and IgA. IgA is the mucosal antibody that is expected from vaccines that touch a mucous membrane. IgG is the blood antibody with the highest concentration.

Some pigs or their mothers had been exposed to Salmonella earlier in life (as indicated by time zero IgG levels). No pigs had baseline IgA levels which indicates that none of the pigs have had a recent Salmonella infection.

The results (Tables 2 and 3) surprisingly show that the pigs self-administered the vaccine as well or better than hand spraying—but with virtually no labor. This demonstrates that it would take very little labor/time to allow pigs to self-vaccinate via the self-sprayer device where they achieve equal or greater vaccine efficacy. This would lead to a significant reduction in time and labor needed to vaccinate animals as compared to vaccinating by hand.

Figure 7:
FIG. 7 shows an example pig vaccinated using the sprayer device.

Table 2 shows IgG levels of pigs before and after vaccination (or not in case of the control). At 14 days after exposure to the vaccine, both the label use and sprayer found 100% of the sows had seroconverted (meaning they had high antibody levels from the vaccine). FIG. 7 shows an example pig vaccinated using the sprayer device.

TABLE 2

Serum IgG antibody to *Salmonella*

| TRT | % Positive PRE | % Positive 14 D |
|---|---|---|
| Control | 25% | 58% |
| Label/hand | 50% | 100% |
| Sprayer device | 33% | 100% |

Table 3 shows oral fluid (saliva) IgA antibody levels. The control pigs had no measurable IgA antibody levels at either time point. The self-administered sprayer provided equal or better efficacy as hand spraying. A response over 0.01 indicates antibody production.

TABLE 3

Oral Fluids IgA to *Salmonella*

| TRT | S/P 14 D | S/P 21 D |
|---|---|---|
| Control | 0.01 | 0.01 |
| Label/hand | 0.70 | 0.77 |
| Sprayer device | 0.73 | 1.21 |

One skilled in the art will readily appreciate that the present disclosure is well adapted to carry out the objectives and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

What is claimed is:

1. A self-sprayer device for self-administering an animal product to an animal, the device comprising:

a pushing plate comprising a sprayer hole and a hinge;

one or more side plates connected to the pushing plate, the pushing plate and the one or more side plates forming a top opening; and a base plate extending from the bottom of the pushing plate;

a dimple with a hole on the base plate; and a collection vial below the base plate and under the hole in the dimple, wherein the dimple and the collection vial are operable to collect an oral fluid sample from the animal, and wherein the pushing plate is operable to move, via the hinge, and release the animal product through the sprayer hole.

2. The device of claim 1, wherein at least one of the one or more side plates comprise one or more attachment points operable to connect the device to a wall or fence.

3. The device of claim 1, further comprising a photocell operable to trigger release of the animal product when the animal breaks a photo beam from the photocell.

4. The device of claim 1, wherein the pushing plate is round, rectangular, or any shape that accommodates an animal's snout or face.

5. The device of claim 1, wherein the animal is a pig.

6. The device of claim 1, further comprising a bottle or plumbed line to a container operable to hold the animal product.

7. The device of claim 6, wherein the bottle comprises a nozzle operable to trigger the release of the animal product from the bottle and through the spraying hole.

8. The device of claim 1, further comprising an engagement item operable to provide environmental enrichment to the animal, wherein the engagement item comprises one or more ropes, rubber materials, plastic materials, rods, chains, or toys.

9. The device of claim 8, wherein the engagement item is connected to one or more slots on at least one of the one or more side plates.

10. The device of claim 1, wherein the animal product is selected from the group consisting of drugs, antibiotics, vaccines, insecticides, pheromones, and other animal health products.

11. The device of claim 10, wherein the animal product further comprises a dye.

12. The device of claim 10, wherein the animal product is a maternal pheromone or other semiochemical and the device is configured to be used to reduce fighting, increase feeding, or stop tail biting, ear chewing, ear necrosis, or belly nosing.

13. The device of claim 10, wherein the device is configured to be used to induce estrus in a pre-pubertal animal or identify an animal in estrus.

14. A method of self-administering an animal product to an animal, the method comprising:

placing a self-sprayer device in a pen holding the animal, the device comprising:

a pushing plate comprising a sprayer hole and a hinge;

one or more side plates connected to the pushing plate, the pushing plate and the one or more side plates forming a top opening; and a base plate below the bottom of the pushing plate;

releasing the animal product through the sprayer hole when the animal moves the pushing plate; and collecting an oral fluid sample from the animal in a collection vial below a dimple on the base plate.

15. The method of claim 14, further comprising providing multi-sensory environmental enrichment to the animal, wherein the device further comprises an engagement item.

16. The method of claim 14, wherein the animal product comprises a pheromone and a dye.

17. The method of claim 16, further comprising inducing estrus in a pre-pubertal animal based on the amount of dye sprayed on the animal's face.

18. The method of claim 16, further comprising identifying that the animal is in estrus based on the amount of dye sprayed on the animal's face.

* * * * *